United States Patent

[11] 3,600,565

[72] Inventor Donald F. Forbes, Sr. Fairfax, Va.

[21] Appl. No. 789,107
[22] Filed Jan. 2, 1969
[45] Patented Aug. 17, 1971
[73] Assignee The United States of America as represented by the Secretary of the Navy

[54] SIGNAL TRACKER AND ANALYZER
6 Claims, 14 Drawing Figs.

[52] U.S. Cl. .......... 235/168, 340/146.2, 235/151.31, 324/103, 328/135
[51] Int. Cl. .......... G06f 7/38, G06f 7/02
[50] Field of Search .......... 340/146.2; 235/177, 151.31, 168; 324/103; 328/135, 116, 117, 150, 151

[56] References Cited

UNITED STATES PATENTS

| | | | |
|---|---|---|---|
| 2,783,453 | 2/1957 | Rose | 235/177 X |
| 3,187,303 | 6/1965 | Chiapuzio et al. | 235/177 X |
| 3,273,122 | 9/1966 | Chandler | 235/177 X |
| 3,328,705 | 6/1967 | Eubanks | 328/151 |
| 3,369,182 | 2/1968 | Reindl | 328/151 X |
| 3,487,365 | 12/1969 | Henderson | 340/146.2 |

OTHER REFERENCES

" Detecting Significant Points in Analog Data," W. P. Margopoulos, D. E. Norton & R. L. Taylor, IBM Technical Disclosure Bulletin, Vol. 4, No. 5, October 1961, Pgs. 19— 20

*Primary Examiner*—Malcolm A. Morrison
*Assistant Examiner*—James F. Gottman
*Attorneys*—R. S. Sciascia and A. L. Branning

ABSTRACT: The invention comprises a system using digital techniques, for retrieving information contained in the amplitude variations of a received signal. The invention comprises a first register which instantaneously tracks the received signal, a second register which tracks the highest and a third register which tracks the lowest value of the signal. The outputs of the second and third registers are subtracted in order to arrive at the information desired.

INVENTOR
DONALD F. FORBES, SR.

BY [signature]
ATTORNEY

INVENTOR
DONALD F. FORBES, SR.

BY [signature]
ATTORNEY

INVENTOR
DONALD F. FORBES, SR.

BY [signature]
ATTORNEY

SIGNAL TRACKER AND ANALYZER

STATEMENT OF GOVERNMENT INTEREST

The invention described herein may be manufactured and used by or for the Government of the United States of America for governmental purposes without the payment of any royalties thereon or thereof.

BACKGROUND OF THE INVENTION

The invention relates generally to a system for processing signals transmitted from a satellite wherein information is represented by variations in peak amplitudes. More specifically the invention consists of a completely digital system for measuring, storing and continuously updating this information and putting it in a form presentable to a digital computer.

Prior art systems have abstracted the information in the satellite signal by recording it on a strip recorder and subsequently transcribing it to be usable as an input to a digital computer. This procedure is time consuming, expensive and inaccurate.

Summary of the Invention

The system therefore comprises a completely digital method of tracking the peak amplitude of a received signal by having one register which instantaneously tracks the received signal, and second and third registers which track the highest and lowest values of the amplitude of the signal. Tracking is accomplished by utilizing an end around carry signal generated by adding the outputs of selected registers. The peak amplitude is finally arrived at by subtracting the outputs of the second and third registers by complementary addition in a digital adder.

Objects of the Invention

It is therefore an object of the invention to track a signal received from a satellite in which information is contained as variations in the peak amplitude of the signal.

It is a further object to have a system which is completely digital thereby reducing analysis time.

Another object is to provide a system which stores previous signal values and updates for changes in these values.

Still another object is to automatically put the received information in a form acceptable as an input to a digital computer.

DESCRIPTION OF THE PREFERRED EMBODIMENT

Figures 1A, 1B, 1C, 1D, 1E, 1F, 1G, 1H, 1I, 1J, 1K, 1L:
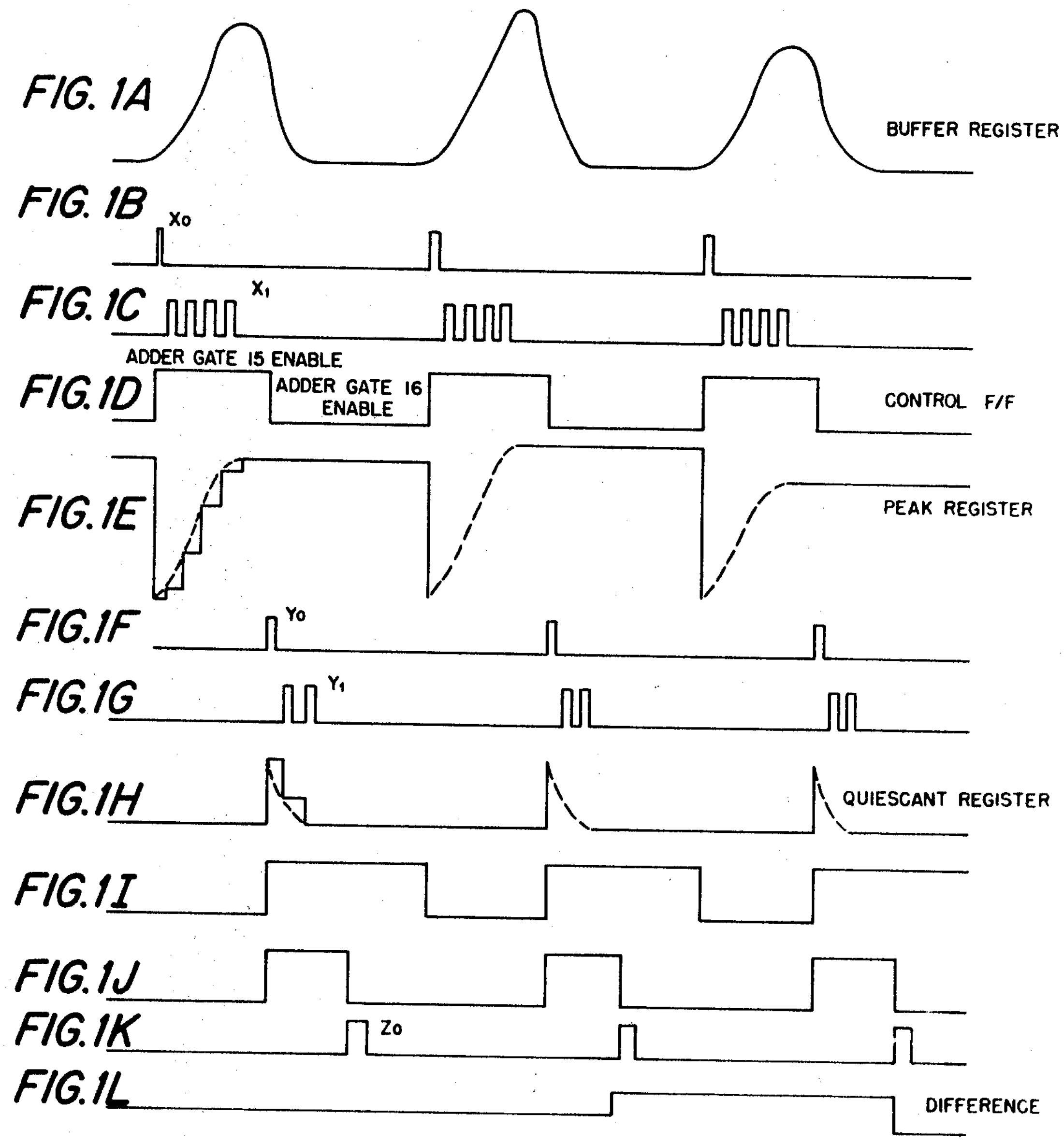
FIGS. 1A through 1L show a series of waveforms useful in describing the preferred embodiment.
Figure 2:
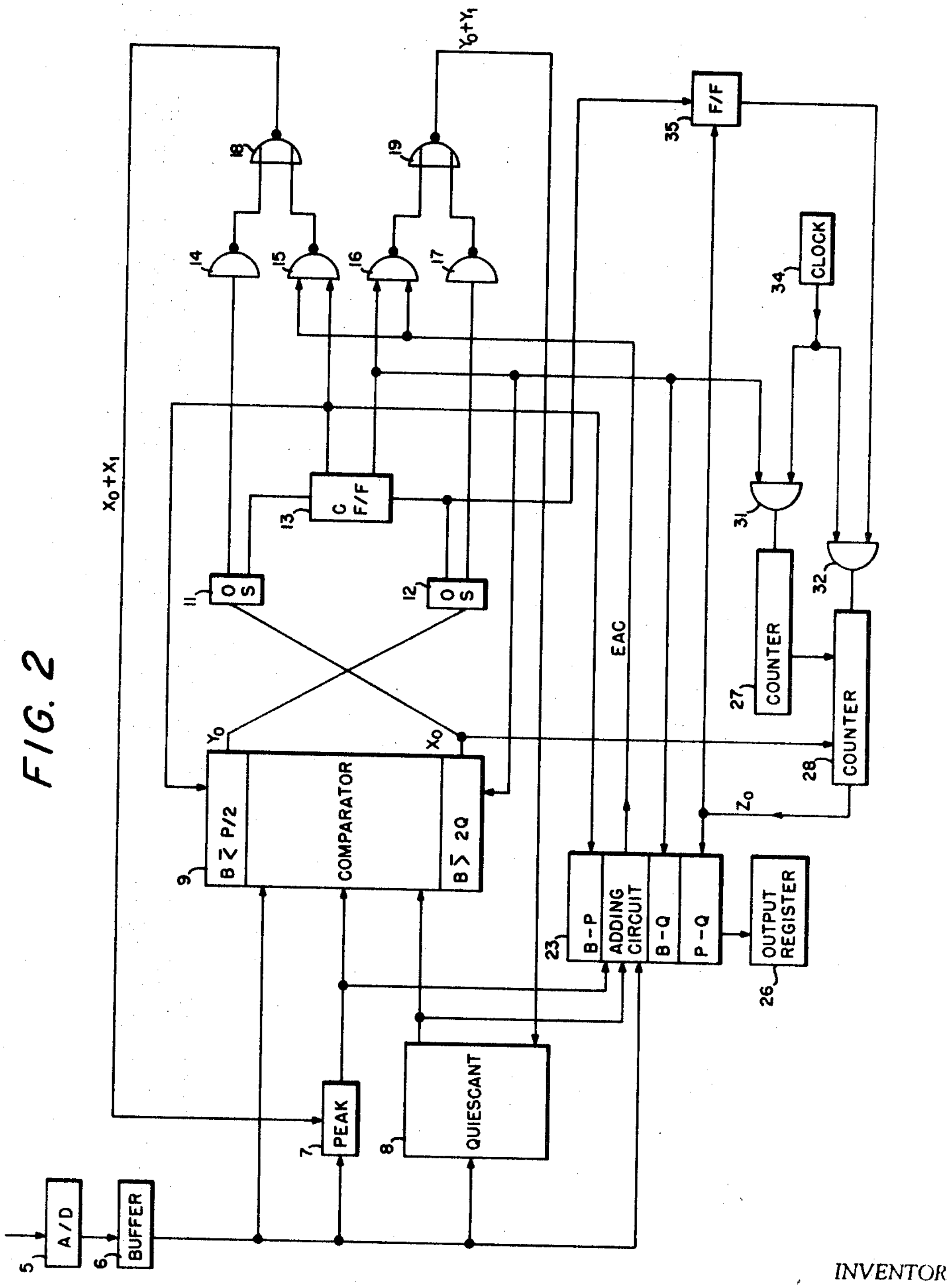
FIG. 2 shows the preferred embodiment.

A broad discussion of the operation of the invention will now be given with reference to FIGS. 1 and 2. As previously discussed, the input to the system is an amplitude modulated signal of the general form shown in FIG. 1A. Note that the signal is composed of pulses which may vary in peak amplitude from one pulse to the next. The input to the system passes through an analog to digital converter 5 and is fed to a buffer register 6. The output of the buffer register will be instantaneous value of the amplitude of the input in digital form, and in the preferred embodiment consists of 10 pairs of lines, each pair containing a true value digit and its complement. The buffer register 6 can therefore be said to digitally track the input amplitude. FIG. 1A can also be considered as an analog representation of the digital output of the buffer. The object of the invention is to measure the peak amplitude of the input pulses, to store this value and to update it if changes occur. This is accomplished by having one register, the peak register 7, track the highest value of the input waveform, and another register, the quiescant register 8, track the lowest value of the input waveform. The peak amplitude is arrived at by subtracting the value contained in the quiescant register from that contained in the peak register.

In order to accomplish this the buffer 6 is coupled to both the peak and quiescant registers. All three registers have an output consisting of 10 pairs of lines, each pair containing a true value digit and its complement and also are coupled to the comparitor 9. When the output of the buffer register 6 reaches a value equal to or greater than twice the value of the quiescant register, the comparitor 9 will provide an output pulse $X_o$ shown in FIG. 1B. The $X_o$ pulse will turn on control flip-flop 13 thereby enabling gate 15. The output of the control flip-flop 13 is shown in FIG. 1D. In addition $X_o$ will pass through inverter 14 and gate 18 to peak register 7 thereby momentarily allowing the peak to take on the value of the buffer. This can be seen from FIG. 1E. The control flip-flop, acting in response to $X_o$ also triggers an operation in the adding circuits 23 and also is fed back to the comparator to disable it. In response to the control flip-flop, adding circuits 23 provide a series of end around carry pulses shown in FIG. 1C as long as the value of the buffer is greater than that of the peak. These end around carry pulses will be fed to gate 15. The adding circuits will be more fully discussed below. Since gate 15 has previously been enabled by the output of the control flip-flop the end around carry pulses $X_1$ will be passed by gates 15 and 18 to the peak register thereby allowing the peak register 7 to track the buffer. As each end around carry pulse arrives at gate 15 the peak register 7 will assume the value of the buffer register 6. FIG. 1E is an analog representation of the tracking process of the peak register. The end around carry pulses produced by the adder will stop when the value of the buffer is equal to or less than the value of the peak register. The peak register will discontinue its tracking and will retain the peak value of the output of the buffer 6.

The comparator will produce an output pulse $Y_o$ shown in FIG. 1F when the value of the buffer register 6 is equal to or less than one-half the value of the peak register 7. $Y_o$ will switch the control flip-flop 13, thereby enabling gate 16 and disabling the comparator 9. $Y_o$ will also pass directly through inverter 17 and gate 19 to the quiescant register thereby causing the quiescant register to assume the value of the buffer as shown in FIG. 1H. Adding circuits 23, in response to control flip-flop will provide end around carry pulses $Y_1$ so long as the value of the buffer register is smaller than that of the quiescant register. The end around carry pulses $Y_1$ will pass through gate 16 which has been enabled by the control flip-flop 13 and through gate 19 to the quiescant register thereby causing it to track the buffer until the lowest value of the buffer is reached at which point the end around carry pulses will cease and the quiescant will hold that value. FIG. 1H illustrates the tracking process of the quiescant register. Notice that the quiescant register tracks so long as $Y_1$ is being generated and holds the value attained when $Y_1$ ceases.

At the time that $Y_1$ ceases, the output of the peak register is equal to the value of the highest amplitude of the input while the quiescant register has an output equal to the lowest value of the input. This can be clearly seen from FIG. 1E and 1H. The peak amplitude is therefore the difference between what is stored in quiescant and peak registers. The system therefore subtracts the values of these registers during the time after the ceasing of $Y_1$ and before the occurrence of the next $X_o$ pulse. A series of counting circuits measure the time between $Y_o$ and $X_o$ divide it by two and at the end of this time period generate a dump pulse $Z_o$ which allows the difference between the quiescant and peak register to be stored in the output register 26. The timing circuits will be described in more detail below. A comparator card commercially available from Raytheon Inc. as computer part No. MPC2 was used in the preferred embodiment to generate the $X_o$ and $Y_o$ pulses. The exact number of cards necessary will depend on the number of digits in the register outputs. Use of the cards to obtain the desired output would be obvious to one skilled in the art.

Several methods of generating the dump pulse $Z_o$ can be utilized. If the pulses to be analyzed are very regular in nature it would be possible to generate a pulse a preselected time after the occurrence of a peak. The method used in the preferred embodiment is to have a first counter 27 measure the time between $Y_o$ and $X_o$. This is accomplished by enabling gate 31 during the gate 16 enable period from control flip-flop 13. The output of this counter is illustrated in FIG. 1I. A second counter would be used to divide the output of the first counter in half, as shown in FIG. 1J.

This is accomplished by presetting counter 28 to a value equal to one-half the complement of counter 27 at time $X_o$ and stepping counter 28 starting at $Y_o$ until it reaches a zero value at which time $Z_o$ is generated which turns off counter 28 by disabling flip-flop 35. Thus, counters 27 and 28 start counting upon the occurrence of $Y_o$, however, counter 27 will continue counting for the entire period from $Y_o$ to $X_o$ while counter 28 is preset to a particular value measured by counter 27 on the preceding pulse and then is run until it reaches zero at which time $Z_o$ is generated and counter 28 is turned off. It is noted that counter 28 is first turned on $Y_o$ by means of flip-flop 35 and later turned off by $Z_o$ again through flip-flop 35. One-half the value of counter 27 is arrived at by a shifting of its output one place to the left. The arrival of an $X_o$ pulse at counter 28 allows the transfer of this value. It is noted again that several other methods of generating the dump pulse $z_o$ possible keeping in mind the object which is to transfer the difference between the peak and quiescant registers into the output register at a proper time which will not interfere with the operation of the system. Dump pulse $Z_o$ is illustrated in FIG. 1K. Upon the occurrence of $Z_o$ the adder will provide an output equal to the difference between the value of the peak and quiescant registers, which is dumped into the output register 26, the output of which changes as shown in FIG. 1L. The counters are switched at a rate determined by clock 34.

Figure 3:
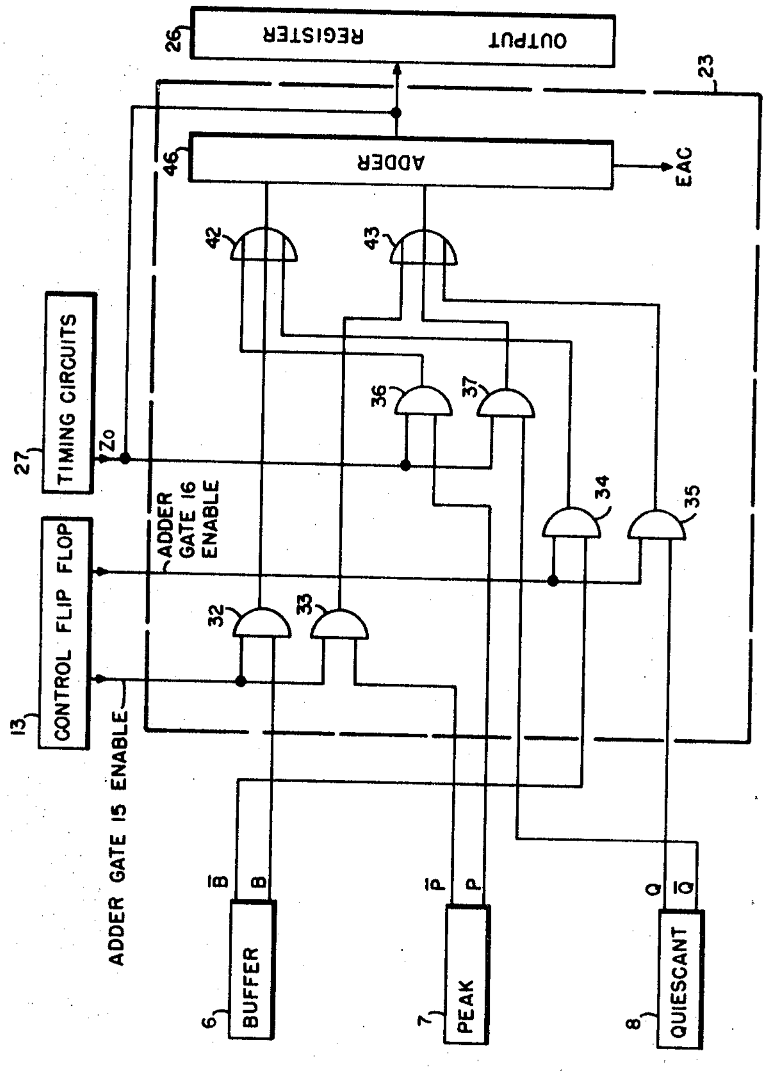
FIG. 3 shows an adding circuit arrangement to be used in the preferred embodiment.

The operations performed by the adding circuits will now be described more fully with reference to FIG. 3. Upon the occurrence of the adder gate 15 enable pulse from the control flip-flop 13, illustrated in FIG. 1 the outputs of the buffer register and the complement of the peak register output are gated into the adder 46. This occurs when gates 32 and 33 are enabled by the control flip-flop allowing the register outputs into the adder 46 by means of gates 42 and 43. FIG. 3 illustrates the gating sequence for only one line out of each register. It is obvious that each of the other lines from the register will have similar gates associated with them. Thus, each true value digit of the buffer and each complementary digit from the peak registers will be gated by other gates similar to 32 and 33 into the adder upon the occurrence of the adder gate 15 enable period. Similarily the other gating operations have associated with them a number of gates for each line. The adder in the preferred embodiment is composed of two half adders. As long as the buffer is larger than the quiescant, an end around carry pulse will be generated, shown as EAC in FIG. 3. The operation of the adder whereby it produces an end around carry pulse so long as one input is larger than another is obvious to one familiar with digital calculators. Upon the occurrence of the adder gate 16 enable pulse, the gates 34 and 35 are enabled thus feeding the complement of the output of the buffer and the output of the quiescant register into the adder by means of gates 42 and 43. Again an end around carry will be produced so long as the buffer is larger than the quiescant. The end around carry pulses are also shown in FIG. 2 and their function in regard to allowing the registers to track has been explained previously. Upon the occurrence of the $Z_o$ pulse from the timing circuits, the gates 36 and 37 will be enabled thereby gating the output of the peak and the complement of the output of the quiescant into the adder through gates 42 and 43. This output is read into the output register 26.

It will be obvious to one skilled in the art that various gating schemes can be employed to carry out the principle of the invention and that the preferred embodiment shown is merely illustrative of one of these alternatives. The comparator can be designed to generate $X_o$ and $Y_o$ at a variety of points other than those discussed in the preferred embodiment.

What is claimed and desired to be secured by Letters Patent of the United States is:

1. A system for digitally processing a series of received pulses which vary in amplitude according to information contained therein, comprising;
- analog to digital conversion means for translating variations in the amplitude of said input signal into digital form,
- a first register for continuously tracking the digital output of said analog to digital conversion means,
- a second register coupled to said first register,
- first tracking means coupled to said second register for allowing said second register to track said first register up to its highest value and hold said highest value,
- a third register coupled to said first register,
- second tracking means coupled to said third register for allowing said third register to track said first register down to its lowest value and to hold said lowest value, and
- means coupled to said second and third registers for computing the difference between values contained in said second and third registers.

2. The system recited in claim 1, wherein said first tracking means comprises;
- means coupled to said first and third registers for generating a first signal when said first register has a value greater than or equal to said third register,
- means coupled to said first and second registers for generating a second signal as long as said first register is greater than said second register, and
- means for allowing said first register to transfer its output into said second register in response to said first and second signals.

3. The system recited in claim 2, wherein said second tracking means comprises;
- means coupled to said first and second registers for generating a third signal when said first register has a value less than said second register,
- means coupled to said first and third registers for generating a fourth signal as long as said first register is smaller than said third register, and
- means for allowing said first register to transfer its output into said second register in response to said third and fourth signals.

4. A method to be performed by a machine of measuring the peak amplitude of an input signal composed of pulses varying in amplitude comprising the steps of:
- continuously converting the varying amplitude of said input signal into a digital output,
- tracking said output up to its highest value,
- holding said highest value,
- tracking said output up to its lowest value,
- holding said lowest value, and,
- computing the difference between said highest and lowest values,

5. Wherein the tracking to said highest value includes:
- transferring said output to a first register during the rise time of said output,
- intermittently generating a first signal after said transfer until said digital output reaches its highest value, and
- allowing said first register to track said output at each occurrence of said first signal

6. Wherein the tracking to said lowest value includes:
- transferring said output to a second register at a time when said output is less than said highest value,
- generating a second intermittent signal from said time until said digital output reaches its lowest value, and
- allowing said second register to track said output upon each occurrence of said signal.